United States Patent [19]

Maitani

[11] Patent Number: 5,126,779
[45] Date of Patent: Jun. 30, 1992

[54] METHOD AND APPARATUS FOR SUCCESSIVELY GENERATING PHOTOMETRIC VALUES

[75] Inventor: Yoshihisa Maitani, Hachioji, Japan

[73] Assignee: Olympus Optical Company Ltd., Japan

[21] Appl. No.: 658,888

[22] Filed: Feb. 22, 1991

Related U.S. Application Data

[63] Continuation of Ser. No. 469,471, Mar. 14, 1983, Pat. No. 5,010,359, which is a continuation of Ser. No. 263,032, May 12, 1981, abandoned.

[30] Foreign Application Priority Data

Jul. 31, 1980 [JP] Japan ............ 55-105656

[51] Int. Cl.$^5$ .................................. G03B 7/08
[52] U.S. Cl. .................................. 354/442
[58] Field of Search ............... 354/471–475, 354/442, 456

[56] References Cited

U.S. PATENT DOCUMENTS

| 3,577,140 | 5/1971 | Aasnaes | 341/168 |
|---|---|---|---|
| 3,872,483 | 3/1975 | Numata et al. | 354/471 |
| 4,029,421 | 6/1977 | Sakurada et al. | 356/223 |
| 4,047,187 | 9/1977 | Mashimo et al. | 354/432 X |
| 4,089,010 | 5/1978 | Ito et al. | 354/471 X |
| 4,106,033 | 8/1978 | Nakamoto et al. | 354/475 X |
| 4,125,846 | 11/1978 | Nakamoto et al. | 354/475 X |
| 4,145,129 | 3/1979 | Kawamura et al. | 354/475 |
| 4,174,894 | 11/1979 | Fukuhara et al. | 354/152 X |
| 4,182,573 | 1/1980 | Yamada et al. | 354/432 X |
| 4,253,750 | 3/1981 | Maida | 354/475 |
| 4,277,155 | 7/1981 | Rentschler et al. | 354/442 X |
| 4,304,473 | 12/1981 | Shrere | 356/221 X |
| 4,306,785 | 12/1981 | Tano et al. | 354/475 X |
| 4,309,090 | 1/1982 | Yamada | 354/475 X |
| 4,376,265 | 3/1983 | Kiuchi et al. | 324/426 |
| 4,402,587 | 9/1983 | Yamaski | 354/289.1 X |

OTHER PUBLICATIONS

Anonymous, "Can II SLR Meters All Be Right??", Modern Photography, pp. 106–107, Nov. 1969.

Primary Examiner—W. B. Perkey
Attorney, Agent, or Firm—Louis Weinstein

[57] ABSTRACT

A method and apparatus for effecting photometry in an automatic exposure camera includes the provision of photometric means which determines the brightness of an image field. Upon depression of an operating button, photometry is successively made of the brightness of an object being photographed, utilizing the photometric means, and corresponding photometric values are derived. Each successive value generated replaces the value previously generated. The last value generated is stored for subsequent use upon release of the operating button.

7 Claims, 5 Drawing Sheets

METHOD AND APPARATUS FOR SUCCESSIVELY GENERATING PHOTOMETRIC VALUES

This is a continuation of application Ser. No. 469,471, filed Mar. 14, 1983 now U.S. Pat. No. 5,010,359 which is a continuation of application Ser. No. 263,032, filed May 12, 1981, now abandoned.

BACKGROUND OF THE INVENTION

The invention relates to a method and apparatus for photometry from plural points of an automatic exposure camera, and more particularly, to a novel method of photometry in which spotwise photometric means of the storage type is provided in an automatic exposure camera and is used to effect photometry from plural points and the values obtained are averaged, and a photometric apparatus used to carry out the method. When power is provided to the photometry circuit, photometry is successively conducted with each new value replacing the previously generated value, so long as the photometry circuit receives operating power.

As is well recognized, a photometric technique in conventional automatic exposure cameras may be categorized into an average photometry and a spotwise photometry type. The average photometry may be subdivided into one in which an average over the full image field is taken and another in which the emphasis is placed on a central region. A tolerable result is obtained for ordinary objects being photographed by this average photometry method, which is more easy to use than the spotwise photometry method and hence is generally employed in almost all cameras of general use.

The spotwise photometry method is effective when the exposure value is to be controlled in accordance with a bright or dark portion, or a highlight and a shadow, of an object being photographed in which the ratio of brightness between these portions is high. However, its operation is troublesome and is highly susceptible to the production of a picture having an improper exposure. In the past, some cameras have been offered on the market in which the photometry is directed to only a central region of the image field. However, the composition is difficult to define, and there is no automatic exposure camera currently which adopts such photometry.

From the foregoing, it can be concluded that the average photometry method is superior to the spotwise photometry method when taking pictures of ordinary objects. However, practical objects being photographed are not limited to those having a low brightness ratio, but there are a number of objects exhibiting a high brightness ratio such as those in rear light, those on a stage, and those framed by a window through which the exterior sight is composed. In particular, the chance of taking pictures of objects exhibiting a high brightness ratio increases with an increasing level of skill of a photographer. When a picture is taken of an object being photographed which exhibits a high brightness ratio by utilizing an automatic exposure camera which adopts the average photometry method, the exposure is controlled in accordance with the averaged brightness of the object, preventing the intended composition of a photographer from being fully achieved as might be achieved by controlling the exposure in accordance with the highlight or shadow.

In the prior art practice, when taking a picture of an object of a special kind such as described immediately above, a so-called spot exposure meter having a very small photometric angle is used to effect photometry from plural points on the object being photographed. An exposure factor such as exposure period is determined on the basis of information relating to the brightness of the object thus obtained, and the photographic intention where a proper exposure should be given and what degree of brightness the shadow should exhibit, and the camera is manually operated to take a picture. Where an object being photographed is accessible as when taking a picture in a studio, an exposure meter of the type which receives incident light is used to effect photometry of desired plural points on the object in order to determine an exposure factor or factors before the camera is manually operated to take a picture. However, the use of an exposure meter which is separate from the camera to effect spotwise photometry to determine exposure factors requires a troublesome procedure and hence a complex calculation, and is also time consuming.

SUMMARY OF THE INVENTION

In view of the foregoing, it is an object of the invention to provide a method and apparatus for photometry from plural points of an automatic exposure camera in which spotwise photometric means of the storage type is provided in an automatic exposure camera and is utilized to enable a photographer to fully realize his composition through a simple operation.

In accordance with the invention, a photometric element which is internally housed within a camera is utilized to effect spotwise photometry from desired locations on an object being photographed, thus dispensing with an exposure meter or other instrument which is separate from the camera.

Before the exposure is made, a spotwise photometric region within a finder is brought into alignment with a point on an object being photographed the photometry of which is to be made, and a photometry switch is closed. The brightness at that point is focused upon the photometric element preferably when a reflecting mirror is in a down position. The photometric element is displaced from the reflecting mirror so as not to conflict with its operation. This simple operation may be repeated as many times as desired to effect photometry from plural points.

In addition, the determination of exposure factors is automatically performed by the camera on the basis of information relating to the brightness of the object which is obtained by the photometry, thus eliminating the need for a complex calculation.

The exposure of the camera is automatically controlled in accordance with the exposure factors determined in the manner mentioned above, thus dispensing with a manual setting of exposure factors as required in a manual operation.

The determination of the exposure factors is automatically and accurately achieved by the use of a photometric circuit and an arithmetic circuit of the camera, including a storage device provided within the camera for storing brightness values, avoiding any likelihood that a wrong calculation results in an improper exposure. Photometry values for a particular image point are successively generated so long as the camera is turned on, each new value replacing the value first previously generated. The last generated value is stored upon depressing a store button.

DESCRIPTION OF PREFERRED EMBODIMENTS

Figure 1:
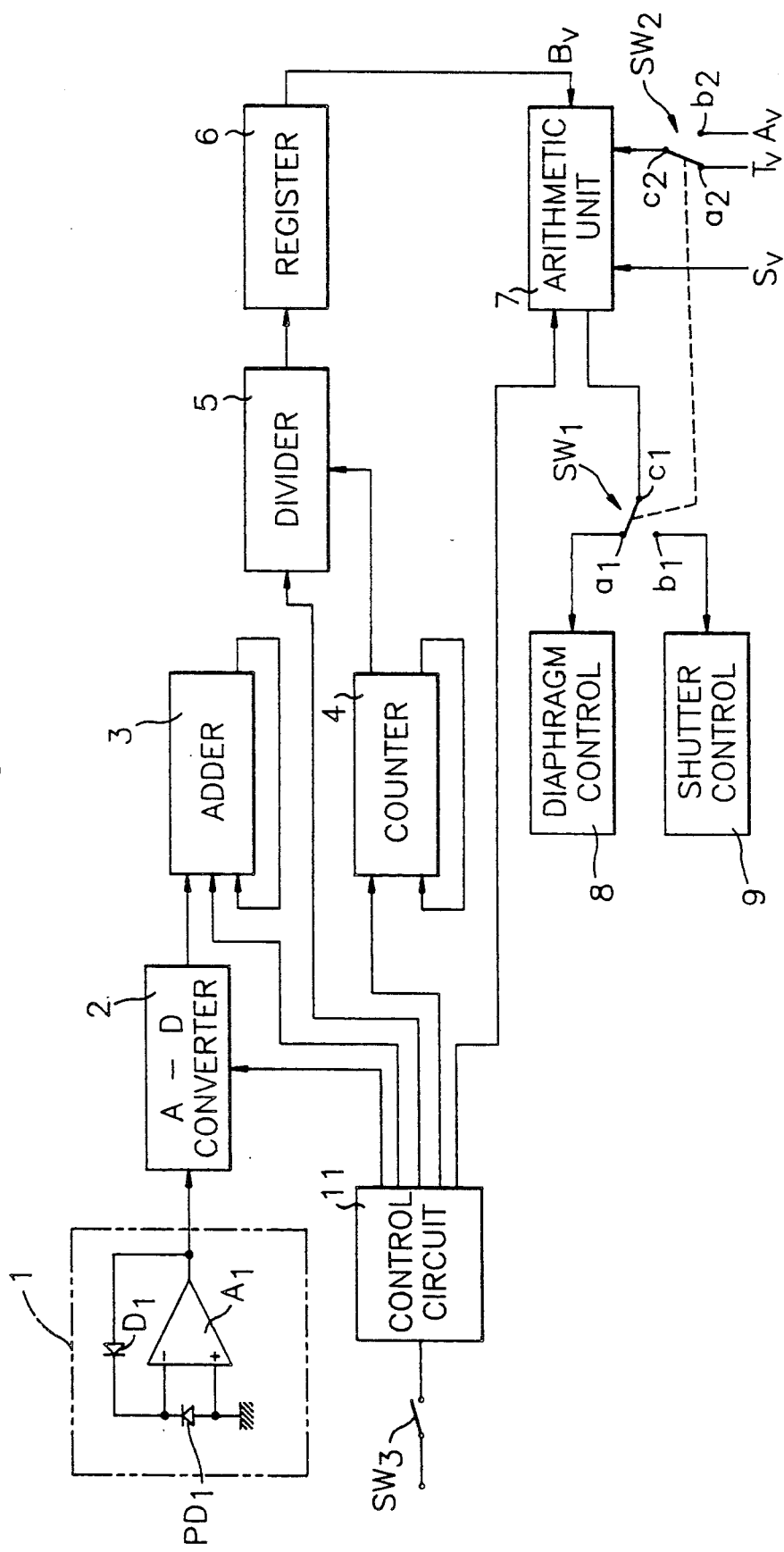
FIG. 1 is a block diagram of an electrical circuit of an apparatus for photometry from plural points of an automatic exposure camera which is constructed according to one embodiment of the invention.

Referring to FIG. 1, there is shown an electrical circuit of an apparatus for photometry from plural points of an automatic exposure camera according to an embodiment of the invention which utilizes the method of photometry from plural points of the invention. The apparatus includes a photometric circuit 1 which effects a spotwise photometry of the brightness of an object being photographed. In addition, the apparatus comprises an A-D converter 2 for converting an analog quantity produced by the photometric circuit 1 and representive of the brightness information into a corresponding digital version, an adder 3 which accumulates successive magnitudes of the digital brightness information, a counter 4 for counting the number of successive accumulations of the magnitudes of the brightness information, a divider 5 for dividing the content of the adder 3 by the count in the counter 4 to provide an average brightness information Bv, a register 6 for storing an output from the divider 5, an arithmetic unit 7 for deriving diaphragm information Av or shutter speed information Tv, a diaphragm control system 8 which is controlled in accordance with a diaphragm information Av produced by the arithmetic unit 7, a shutter control system 9 which is controlled in accordance with shutter speed information Tv which is produced by the arithmetic unit 7, a pair of ganged photographing mode selection changeover switches SW1, SW2 which provide selective switching between a diaphragm preset photographing mode and a shutter preset photographing mode, a control circuit 11 for controlling the operation of the entire electrical circuit, and a photometry switch SW3 connected to the control circuit 11.

The photometric circuit 1 includes a photoelectric transducer element PD1 formed by a photovoltaic element such as a photodiode, a logarithmic compression diode D1 and a differential amplifier A1. The transducer element PD1 is connected across the inverting and the non-inverting input of differential amplifier A1 in reverse polarity. The non-inverting input of the amplifier A1 is connected to the ground which is defined by the body of the camera while the inverting input is connected to an output terminal through a reversely poled diode D1. The transducer element PD1 receives part of the light from an object being photographed and produces a photocurrent of a magnitude which depends on the amount of light received, and the photocurrent is compressed in a logarithmic manner by the diode D1, thus producing an analog quantity representative of the brightness of the object being photographed, at the output terminal of the amplifier A1.

Figure 2:
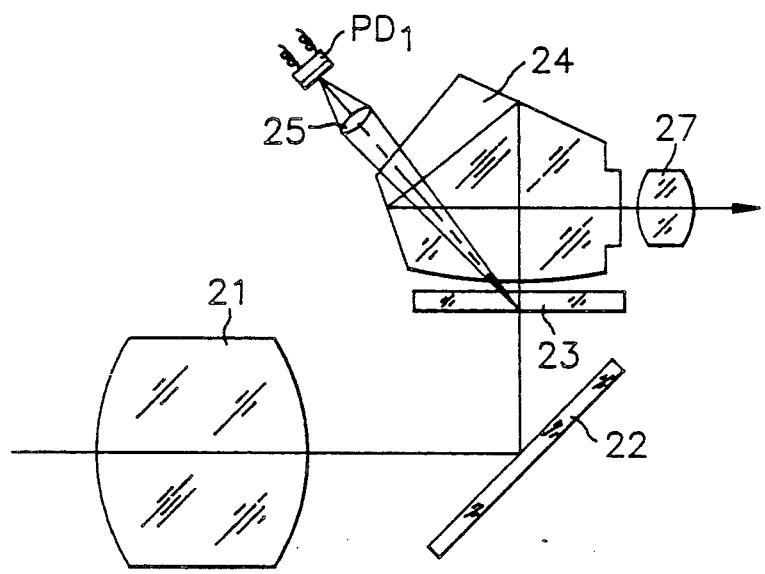
FIG. 2 is a fragmentary side elevation of an automatic exposure camera, illustrating the disposition of a photoelectric transducer element which is used for the spotwise photometry in the arrangement of FIG. 1.
Figure 3:
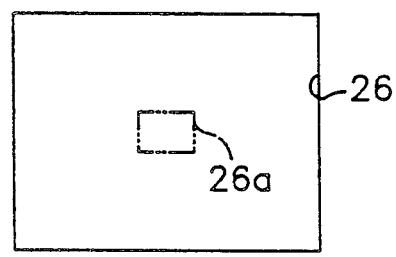
FIG. 3 is a front view of an image field, illustrating a region which is subject to the spotwise photometry by the transducer element shown in FIG. 2.

The transducer element PD1 is disposed adjacent to the finder optics of a single lens reflex camera, as illustrated in FIG. 2, for example. Light from an object being photographed impinges on the camera by passing through taking lens optics 21, and is reflected by a movable reflecting mirror 22 to be focussed onto a focussing glass 23. Part of such light passes through a pentaprism 24 and through an imaging lens 25 which is provided for the purpose of photometry. Said part of the light corresponds to a portion of an optical image of the object which is projected onto a spotwise photometry region 26a, comprising a small area that is substantially centrally located within an image frame 26 (see FIG. 3). In other words, the transducer element PD1 is located to be optically conjugate to the photometry region 26a, so that it determines the light which is projected onto such region 26a. Numeral 27 in FIG. 2 represents an eyepiece of the finder.

Returning to FIG. 1, the changeover switches SW1, SW2 have their movable contacts c1, c2 connected to the arithmetic unit 7. The changeover switch SW1 has a fixed contact a1 which is connected to the diaphragm control system 8 and another fixed contact b1 which is connected to the shutter control system 9. The changeover switch SW2 has a fixed contact a2 which is connected to receive shutter speed information Tv from means, not shown, which establishes a shutter speed, and another fixed contact b2 which is supplied with diaphragm information Av from means, not shown, which establishes a diaphragm aperture. These switches SW1, SW2 are ganged together in a manner such that when the movable contact of the switch SW1 is thrown to the fixed contact a1, the movable contact of the switch SW2 is thrown to the fixed contact a2 while when the movable contact of the switch SW1 is thrown to the fixed contact b1, the movable contact of the switch SW2 is thrown to the fixed contact b2. It is also to be noted that the arithmetic unit 7 is also supplied with film speed information Sv.

The method of photometry from plural points according to the invention will now be described together with the operation of the described apparatus. When a power switch, not shown, is closed, all of the circuits are reset and are rendered operative. By observing the finder, a location on the object being photographed, the photometry of which is to be made, is brought to correspond to the spotwise photometry region 26a, whereupon the photometry switch SW3 is closed. An image of the object at the location which corresponds to the region 26a is formed on the transducer element PD1, which then produces a photocurrent. In this manner, information relating to the brightness of the object being photographed is produced by the photometric circuit 1 and is in the form of an analog quantity which is logarithmically compressed. The converter 2 converts this analog quantity into a corresponding digital version, which is applied to the adder 3. The adder 3 includes a register, to which the inputted digital quantity is applied for addition with the accumulated content therein. When the photometry switch SW3 is closed initially after the power switch is turned on, the content of the register is cleared to zero, and hence the initial digital quantity will be simply stored therein.

On the other hand, the counter 4 detects the closure of the photometry switch SW3 through the control circuit 11, and counts the number of times the photometry switch is closed. When the photometry switch SW3 is closed initially after the power switch is turned on, the counter 4 is initially cleared to zero, and hence it stores "1" for the initial closure.

Subsequently, a plurality of locations on the object being photographed where the photometry are desired is sequentially brought into alignment with the spotwise photometry region 26a, followed by each closure of the photometry switch SW3. Each time the switch SW3 is closed, the adder 3 accumulates the new input to the accumulated content stored therein while the counter 4 counts the number of times the switch SW3 is closed.

Each time the photometry switch SW3 is closed, the divider 5 operates to divide the content of the added 3, as dividend, by the content of the counter 4 which represents a divisor, with its quotient stored in the register 6. Assuming that the photometry switch SW3 has been closed n times, the adder 3 finally contains the sum of n digital quantities each representing the brightness of the object being photographed while the counter 4 contains the count n. In this manner, the magnitude of the quotient stored in the register 6 represents an average value Bv of brightness information over n photometries.

Each time the photometry switch SW3 is closed, the arithmetic unit 7 operates to calculate diaphragm information Av or shutter speed information Tv which is required to provide a proper exposure, on the basis of the average brightness information Bv stored in the register 6, preset film speed information Sv and shutter speed information Tv or diaphragm information Av which is supplied through the changeover switch SW2. When the shutter preset photographing mode is selected by the connection of the movable contacts of the changeover switches SW1, SW2 with the fixed contacts a1, a2, the arithmetic unit 7 responds to a preset value of shutter speed information Tv by calculating diaphragm information Av, which is supplied to the diaphragm control system 8. When the diaphragm preset photographing mode is selected by the connection of the movable contacts of the changeover switches SW1, SW2 with the fixed contacts b1, b2, the arithmetic unit 7 responds to a preset value of diaphragm information Av by calculating shutter speed information Tv, which is supplied to the shutter control system 9. The diaphragm control system 8 or the shutter control system 9 responds to diaphragm information Av or shutter speed information Tv by controlling the diaphragm aperture or the shutter speed to a proper value.

Consequently, a subsequent shutter release permits the exposure to be controlled in accordance with the average brightness information Bv which results from the spotwise photometry of a plurality of points on the object being photographed, for taking a picture thereof.

It is to be noted that the adder 3, the counter 4 and the register 6 are cleared to zero when the power switch is turned off.

Figure 4:
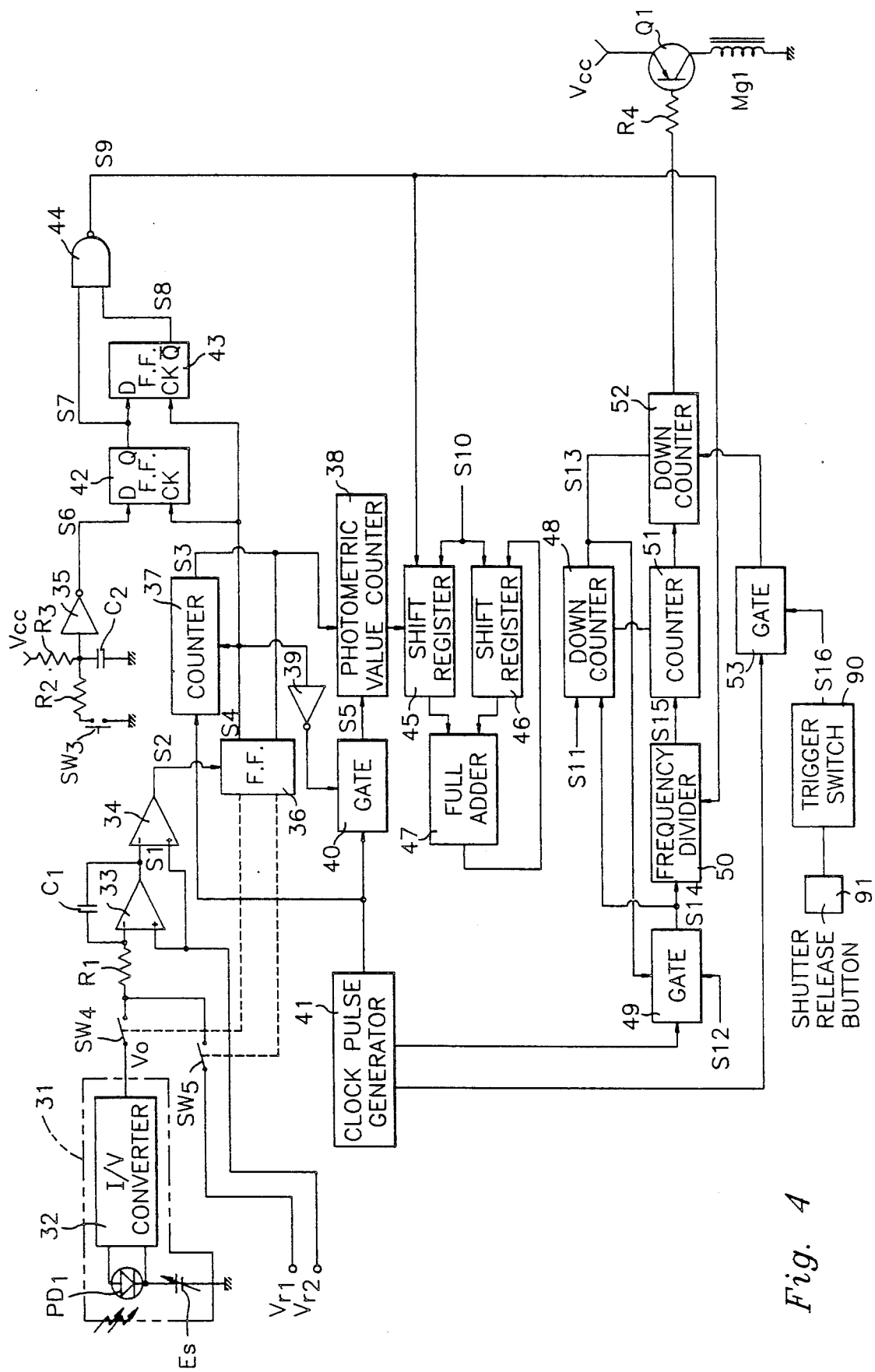
FIG. 4 is a circuit diagram of an apparatus for photometry from plural points constructed according to another embodiment of the invention, the electrical circuit being shown as a more detailed block diagram.

FIG. 4 shows an electrical circuit of apparatus for photometry from plural points which is constructed according to another embodiment of the invention, in a more detailed form than that shown in FIG. 1. In the electrical circuit shown, a photometric circuit 31 which effects spotwise photometry of the brightness of an object being photographed comprises a photoelectric transducer element PD1, a source of variable voltage Es which produces a voltage depending on film speed information Sv and diaphragm aperture information Av, and a current-to-voltage converter 32 which produces a voltage proportional to a photocurrent generated by the transducer element PD1. The transducer element PD1 is connected across a pair of input terminals of the converter 32, and has its cathode connected to the positive terminal of the source Es, the cathode of which is connected to the ground. An output terminal of the photometric circuit 31 or the converter 32 is connected through a switch SW4 to one end of resistor R1. The switch SW4 is controlled by a flipflop 36 to be described later. The junction between the switch SW4 and the resistor R1 is connected to receive a reference voltage Vr1 through a switch SW5, which is also controlled by the flipflop 36.

The other end of the resistor R1 is connected to the inverting of an operational amplifier 33, and an integrating capacitor C1 is connected across the inverting input and the output of the operational amplifier 33, thus providing a negative feedback. In this manner, the combination of the amplifier 33, resistor R1 and capacitor C1 form together an integrating circuit. A reference voltage Vr2 is applied to the non-inverting input of the amplifier 33. The values of the reference voltages Vr1, Vr2 are chosen so that the inequality $V_O > Vr2 > Vr1$ is maintained, where $V_O$ represents an output voltage from the photometric circuit 31. The output of the operational amplifier 33 is connected to the inverting input of a comparator 34, the non-inverting input of which receives the reference voltage Vr2. The output of the comparator 34 is connected to a set terminal of the flipflop 36.

The photometry switch SW3, which is utilized to provide a sampling of the brightness of the object being photographed at desired locations thereon through a manual operation of the photographer, has its one end connected to the ground and its other end connected through resistor R2 to an input of an inverter 35. This input is connected to the ground through an integrating capacitor C2 and is also connected through a resistor R3 to an operating voltage Vcc. The values of resistors R2, R3 and capacitor C2 are chosen to prevent a chattering which might occur when the photometry switch SW3 which is normally open is closed. The output of the inverter 35 is connected to D input of D-type flipflop 42, to be described later.

The output of the flipflop 36 is connected to a control terminal of a counter 37, the output of which is connected to the reset terminal of the flipflop 36. The purpose of the counter 37 is to count clock pulses from a clock pulse generator 41 which is connected to the input thereof. It produces a pulse signal S3 (see FIG. 6A3) whenever a given count is reached. The initiation of a counting operation by the counter 37 is controlled by an output signal S4 (see FIG. 6A4) from the flipflop 36.

The output of the flipflop 36 is also connected through an inverter 39 to a control terminal of a gate 40, and the output of the counter 37 is also connected to a control terminal of a photometric value counter 38 which has its input connected to the clock pulse generator 41 through the gate 40. The photometric value counter 38 counts the number of pulses in an output signal S5 (see FIG. 6A5) from the gate 40 which is proportional to the voltage $V_O$ corresponding to the brightness which is determined by the photometric circuit 31. The gate 40 is controlled by the output signal S4 from the flipflop 36 as supplied through the inverter 39.

The output of the flipflop 36 is also connected to the clock terminals CK of D-type flipflops 42, 43. The flipflop 42 has its D input connected to the output of the inverter 35 and has its Q output connected to the D input of the following flipflop 43 and also to one input of NAND circuit 44. The flipflop 43 has its $\overline{Q}$ output connected to the other input of NAND circuit 44. The combination of the D-type flipflops 42, 43 and NAND circuit 44 form together a synchronous differentiator which is known in itself. It produces a pulse signal S9 (see FIG. 6A9) at the output of NAND circuit 44 which is synchronized with the output signal S4 from the flipflop 36 that is applied to the clock terminal CK thereof and having a duration equal to one period of the signal S4 whenever an input signal S6 (see FIG. 6A6) to the flipflop 42 changes from a low level (hereafter abbreviated as L level) to a high level (hereafter abbreviated as H level).

The output of the photometric value counter 38 is connected to an input of a shift register 45 which has its control terminal connected to the output of NAND circuit 44. As a consequence, the content of the photometric value counter 38 is transferred to the shift register 45 in parallel in response to the pulse signal S9. The output of the shift register 45 is connected to one input of a full adder 47, the output of which is connected to an input of another shift register 46 which stores the result of addition. The output of the shift register 46 is connected to the other input of the full adder 47. In this summer, the shift registers 45, 46 and full adder 47 form together an adder circuit. The contents of the shift registers 45, 46 are applied, bit by bit, to the full adder 47 in response to a shift pulse S10 (see FIG. 6B2) which is applied to the shift terminals of both the registers 45, 46, with the added results again stored in the shift register 46. The output of the shift register 46 is connected to an input of a down counter 48 in order to transfer the content of the register 46 to a following divider circuit.

The content of shift register 46 is transferred to the down counter 48 and retained therein in response to a transfer signal S11 (see FIGS. 6B3 and C1) which is produced in synchronism with the completion of storing the result of addition into the shift register 46 and which is applied to the control terminal of the counter. The down counter 48 includes a decrement pulse input which is connected to the output of a gate 49, and also includes an output which is connected to a control terminal of the gate 49 and to a control terminal of another down counter 52 which is used to store the result of division. The gate 49 includes an input which is connected to the output of the clock pulse generator 41, and also includes an output which is connected to the input of a frequency divider 50. The gate 49 is enabled by a gating signal S12 (see FIG. 6C2) which is produced in synchronism with the completion of the transfer of the content of the shift register 46 to the down counter 48, allowing a clock signal S14 (see FIG. 6C4) from the clock pulse generator 41 to be applied to the down counter 48 and the frequency divider 50. The gate 49 is disabled by a division complete signal S13 (see FIG. 6C3) which is produced by the counter 48 whenever the content therein reaches zero. The frequency divider 50 has an output which is connected to the input of a counter 51 and a control signal terminal which is utilized to determine a frequency division ratio is connected to the output of NAND circuit 44. The down counter 48, gate 49, frequency divider 50 and counter 51 form together a division circuit.

The division circuit which is utilized in the present embodiment will be initially summarized. In general, a division is the most complex of all arithmetic operations. A variety of techniques are known including restoring and non-restoring method to perform a digital division. However, the use of these techniques results in a very complex arrangement of the logical circuit. Accordingly, in the present embodiment, based on the recognition that a sufficient accuracy is achieved to obtain an average of photometric values without deriving digits below the floating point, a simple technique is utilized to perform a division. Specifically, a clock signal from the clock pulse generator is passed through the gate 49 to be applied to the down counter 48 as a reference pulse S14, and is simultaneously divided by a divisor which is equal to the number of photometric measurement before it is applied to the counter 51, whereby a quotient is obtained in the counter 51 when the content of the down counter 48 becomes equal to zero.

Figure 5:
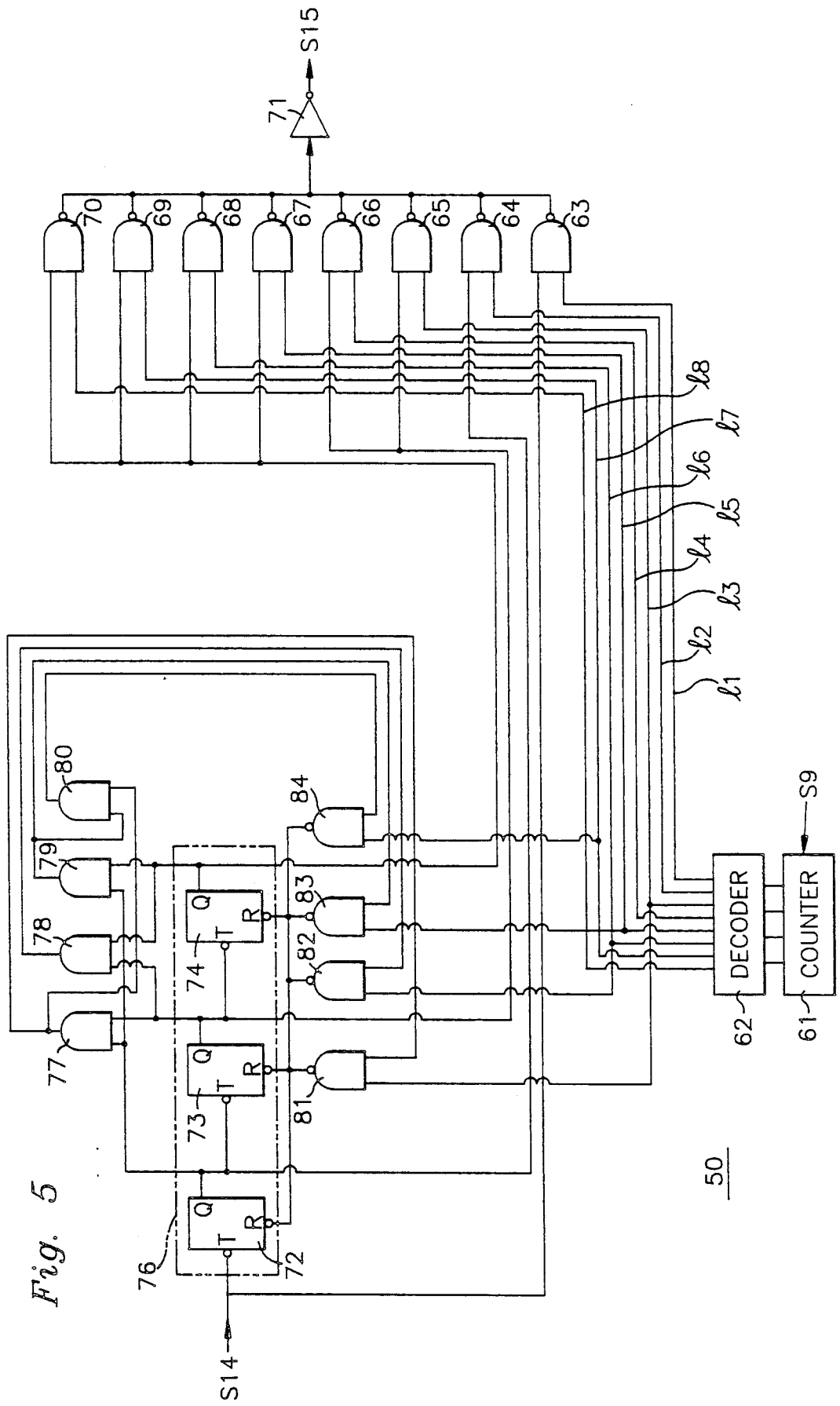
FIG. 5 is a more detailed circuit diagram of a frequency divider shown in FIG. 4.

The frequency divider 50 may be constructed, for example, as specifically shown in FIG. 5. The frequency divider 50 includes a counter 61 which counts synchronous differentiated pulse S9 produced by NAND circuit 44 and which is indicative of the closure of the photometry switch SW3, a decoder 62 which converts the content of the counter 61 or the number of photometric measurements from binary format to a decimal number and produces an H level signal on a corresponding output line, a plurality of NAND circuits 63 to 70 having their one input connected to individual output lines $l_1$ to $l_8$ of the decoder 62, an inverter 71 having an input to which the respective outputs of NAND circuits 63 to 70 are wired OR, a three bit counter 76 formed by three trigger flipflops (hereafter referred to as T-flipflop) 72 to 74 which are sequentially connected and to which the clock signal S14 from the clock pulse generator 41 is applied through the gate 49, and four AND circuits 77 to 80 and four NAND circuits 81 to 84 which operate to reset the three bit counter 76 in accordance with the frequency division ratio of the frequency divider 50.

The first stage T-flipflop 72 of the three bit counter 76 includes an input to which the clock signal S14 from the gate 49 is applied, and an output which is connected to one input of each of AND circuits 77, 79 and NAND circuit 64 as well as to the input of the second stage T-flipflop 73. The output of the second stage T-flipflop 73 is connected to the other input of AND circuit 77, one input of AND circuit 78 and the other input of NAND circuits 65, 66 as well as to the input of the third stage T-flipflop 74. The output of the third stage T-flipflop 74 is connected to the other input of AND circuits 78, 79 and to the other input of NAND circuits 67, 68, 69, 70. The other input of NAND circuit 63 is connected to receive the clock signal S14.

The output of AND circuit 77 is connected to one input of AND circuit 80 and is also connected to one input of NAND circuit 81. The other input of NAND circuit 81 is connected to the output line $l_3$ of the decoder 62. The output of AND circuit 78 is connected to one input of NAND circuit 82, the other input of which is connected to the output line $l_6$ of the decoder 62. The output of AND circuit 79 is connected to the other input of AND circuit 80, and is also connected to one input of NAND circuit 83, the other input of which is connected to the output line l₅ of the decoder 62. The output of AND circuit 80 is connected to one input of NAND circuit 84, the other input of which is connected to the output line l₇ of the decoder 62. The outputs of NAND circuits 81 to 84 are wired OR together and connected to the reset terminal of the individual T-flipflops 72 to 74.

AND circuit 77 detects that the count in the counter 76 has reached "3", and when the frequency division ratio is 3, renders the output from NAND circuit 81 to L level for every three count, thus resetting the counter 76. AND circuit 78 detects that the count in the counter 76 has reached "6", and when the frequency division ratio is 6, renders the output from NAND circuit 82 to L level for every six count, thus resetting the counter 76. AND circuit 79 detects that the counting counter 76 has reached "5", and when the frequency division ratio is 5, renders the output from NAND circuit 83 to L level for every five count, thus resetting the counter 76. AND circuit 80 detects that the count in the counter 76 has reached "7", and when the frequency division ratio is 7, renders the output from NAND circuit 84 to L level for every seven count, thus resetting the counter 76.

The frequency divider 50 is not associated with a circuit which operates to reset the counter 76 for every two, four or eight count whenever the frequency division ratio is two, four or eight, because in these instances, it is unnecessary to reset the counter 76. Specifically, the outputs of the T-flipflops 72, 73, 74 produce one output pulse for every two, four or eight count of the clock signal S14.

The frequency division ratio of the frequency divider 50 can be changed in a range from 1 to $\frac{1}{8}$ in accordance with the count in the counter 61, and an output pulse S15 which has been divided in accordance with such ratio is produced at the output of the inverter 71, which represents the output of the frequency divider 50. Assuming that the number of photometric measurements is three, the decoder 62 produces an H level signal only on the third output line l₃. At this time, all of the remaining output lines l₁, l₂ and l₄ $_{l\ to\ l8}$ assume an L level. When the clock signal S14 is supplied to the three bit counter 76 three times, the outputs of the T-flipflops 72, 73 will be both H level, so that AND circuit 77 produces an H level output. This causes NAND circuit 81 to produce an L level output, which resets the three bit counter 76. In other words, the output of the T-flipflop 73 is rendered to an H level once for every three pulses S14. On the other hand, since NAND circuits 63 to 70 have their one input connected to the output lines l₁ to l₈, respectively, of the decoder 62, it will be seen that of all the NAND circuits 63 to 70, it is only NAND circuit 65 to which the line l₃ is connected that may have its output inverted to an L level. Thus, the output signal S15 from the frequency divider 50 depends upon only the output from NAND circuit 65. The other input of NAND circuit 65 is connected to the output of the T-flipflop 73, so that the output signal S15 from the frequency divider 50 is produced once for every three clock signals S14. Thus, the frequency divider 50 provides an output by dividing the frequency of the clock signal S14 by three.

While the operation of the frequency divider 50 has been described above on the assumption that the division ratio is $\frac{1}{3}$, it should be understood that the operation remains essentially the same for any division ratio from 1 to $\frac{1}{8}$.

Returning to FIG. 4, the output of the counter 51 is connected to the input of a down counter 52. The content of the counter 51 is transferred to the down counter 52 in response to a division complete signal S13 which is produced by the down counter 48 whenever the content of the latter reaches zero, thus temporarily holding the result of division for the average photometric value which is obtained in the counter 51. The output of the down counter 52 is connected through a resistor R4 to the base of an electromagnet controlling switching transistor Q1 of PNP type, which is turned off by an H level signal produced by the counter 52 whenever its count reaches zero. The emitter of the transistor Q1 is connected to an operating voltage Vcc while its collector is connected to the ground through an electromagnet Mg1 which constrains the second blind of a focal plane shutter. Hence, the electromagnet Mg1 is deenergized at the same time as the transistor Q1 is turned off, thus allowing the second shutter blind to begin running. The down counter 52 includes a decrement pulse input which is connected to the output of the clock pulse generator 41 through a gate 53, which is enabled by an exposure initiate signal S16 produced when an exposure initiating trigger switch 90 is closed as a shutter release button 91 of the camera is depressed and the movable reflecting mirror 22 (FIG. 2) moves upward, thereby allowing the clock signal to be supplied to the down counter 52 as a decrement pulse. In other words, the down counter 52 operates as a timer which controls an exposure period from its initiation to its termination to be equal to a value which represents the average of a plurality of photometric determinations.

The operation of the apparatus will now be described with reference to the timing charts shown in FIGS. 6(A1) to (C5). It is to be noted that the method of effecting photometry from plural points on which the apparatus of the present embodiment depends remains unchanged from that illustrated with reference to the first embodiment.

When the camera is moved to bring a point on an object being photographed which is to be determined into alignment with the spotwise photometry region 26a of the finder, a photocurrent produced by the transducer element PD1 and the source Es of variable voltage cause an analog voltage $V_O$ to be developed at the output of the photometric circuit 31 which depends on values of the film speed, diaphragm aperture and brightness of the object. The output voltage $V_O$ gradually charges the integrating capacitor C1, whereby the output voltage S1 from the operational amplifier 33 gradually increases as shown at (A1) of FIG. 6. When the output voltage S1 exceeds the reference voltage Vr2, the output S2 from the comparator 34 inverts to its L level, as indicated at (A2), whereby the output S4 from the flipflop 36 responds to the falling edge of the output S2 from the comparator 34 by inverting to its H level, as indicator at (A4) of FIG. 6. At the same time, the switch SW4 is opened while the switch SW5 is closed. The inversion of the output S4 from the flipflop 36 to its H level permits the counter 37 to begin counting the clock signal from the clock pulse generator 41. However, the output from the inverter 39 remains at its L level under this condition, thus disabling the gate 40 to prevent a counting operation by the photometric value counter 38.

Figure 6:
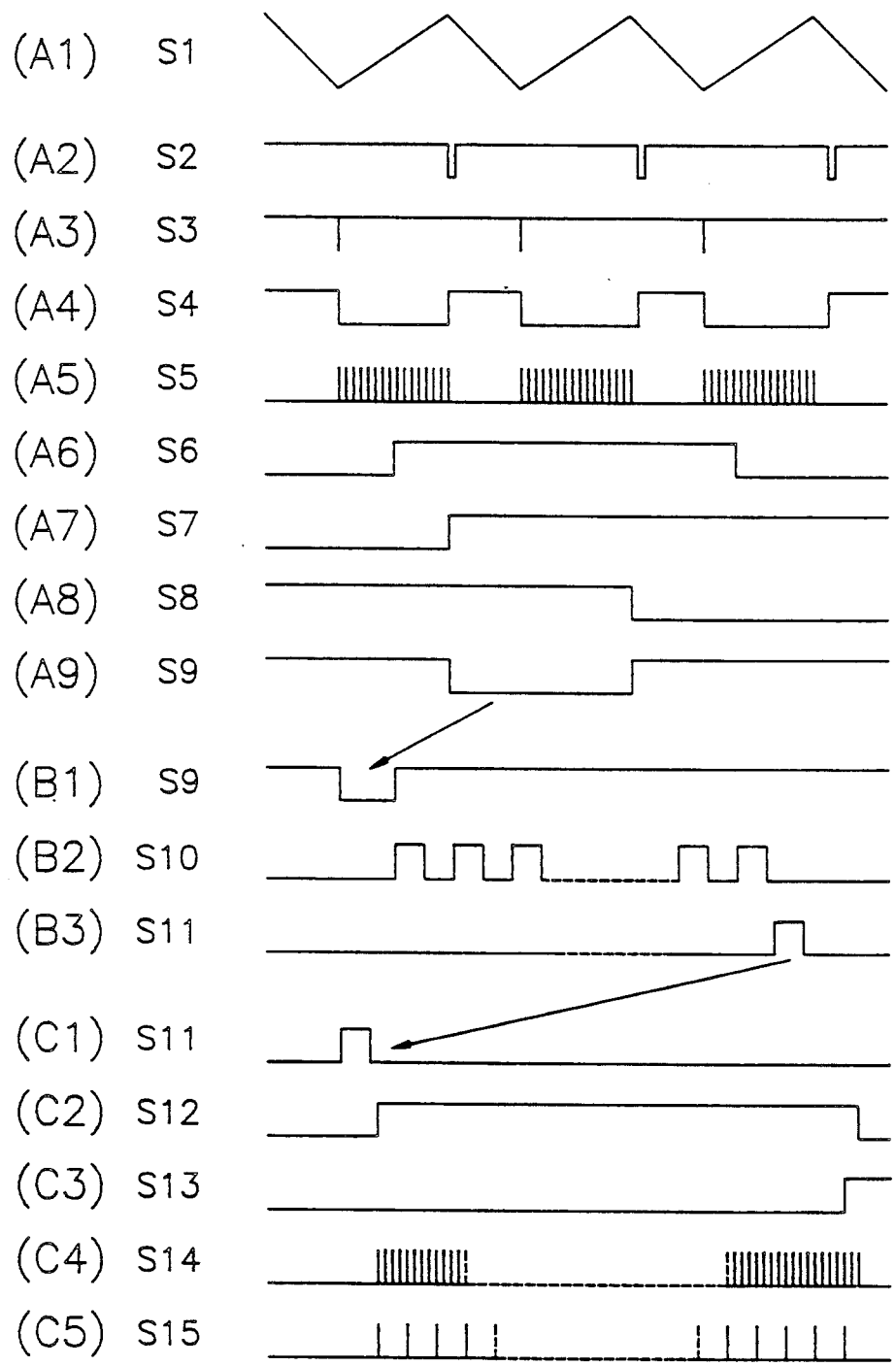
FIGS. 6(A1) to (C5) are a series of timing charts illustrating the operation of the electrical circuit shown in FIG. 4.

When the switch SW4 is open and the switch SW5 is closed, the higher value of the reference voltage Vr2 than the reference voltage Vr1 causes the output S1 from the operational amplifier 33 to decrease in linear manner as the integration proceeds, as indicated at (A1) of FIG. 6. Consequently, the output S2 from the comparator 34 returns to its H level immediately after the opening of the switch SW4 and the closure of the switch SW5, as shown at (A2) of FIG. 6. At a given time interval, which is preset by the counter 37, after the closure of the switch SW5, the output S3 from the counter 37 changes to its L level as shown at (A3) of FIG. 6, inverting the state of the flipflop 36 as indicated at (A4) of FIG. 6. This causes the L level signal S4 to be applied to the control terminal of the counter 37, which is therefore reset. The photometric value counter 38 is also reset by the L level output S3 from the counter 37.

Since the flipflop 36 changes its status, the switch SW4 is again closed while the switch SW5 is opened. Because the value of the reference voltage Vr2 is established at a lower level than the output $V_O$ from the photometric circuit 31, the output S1 from the operational amplifier 33 again begins to increase, as shown at (A1) of FIG. 6. Simultaneously, the L level output S4 from the flipflop 36 causes the inverter 39 to produce an H level output, which enables the gate 40 to permit the clock signal S5 from the clock pulse generator 41 to be supplied to the photometric value counter 38, as indicated at (A5) of FIG. 6. Thus, the photometric value counter 38 begins counting the clock signal S5. When the output S1 from the operational amplifier 33 again exceeds the reference voltage Vr2, the output S2 from the comparator 34 again inverts to its L level, as indicated at (A2) of FIG. 6. This causes the output S4 of the flipflop 36 to change to its H level again, disabling the gate 40. Hence, the clock signal S5 ceases to be inputted to the photometric value counter 38, which ceases a further counting operation while holding the prevailing count.

The count held by the photometric value counter 38 depends on the brightness of an object being photographed. If the object exhibits an increased brightness, the output S1 from the operational amplifier 33 will reach the level of the reference voltage Vr2 in a reduced length of time, thus decreasing the count. On the contrary, for an object of a reduced brightness, the length of time required for the output S1 to reach the level of the reference voltage Vr2 increases, thus increasing the count. Hence, it can be concluded that the count in the photometric value counter 38 represents a proper exposure period which depends on the values of the film speed, the diaphragm aperture and the brightness of the object being photographed. By properly choosing the values of various circuit parameters, the product of the count and the duration of the clock signal S5 may be made equal to the magnitude of the proper exposure period. In other words, the count held by the photometric value counter 38 can be regarded as a digital equivalent of the output voltage $V_O$ from the photometric circuit 31 which represents the proper exposure period. It is to be understood that the A-D conversion circuit as used in the apparatus of the present embodiment is well known in the art as a double integrating circuit.

The photometric value counter 38 is reset by a reset signal S3 which is produced by the counter 37 at a given time interval. The output voltage $V_O$ of the photometric circuit 31 is again subject to an A-D conversion, and the number of the clock signals S5 which corresponds to the proper exposure period is stored in the photometric value counter 38. In the apparatus of this embodiment, a photometry of the object being photographed is repeated at a given time interval, and the latest photometric value is stored in the photometric value counter 38.

When the photographer manually closes the photometry switch SW3, the output S6 from the inverter 35 assumes its H level for a time during which the switch SW3 remains closed, as shown at (A6) of FIG. 6, whereby the output S7 from the D-type flipflop 42 changes to its H level in response to the rising edge of the output S4 of the flipflop 36, as indicated at (A7) of FIG. 6. The inverted output S8 from the D-type flipflop 43 changes to its L level in response to the falling edge of the output S4 from the flipflop 36, as indicated at (A8) of FIG. 6. Accordingly, NAND circuit 44 produces the synchronous differentiated output S9 which remains at its L level for a period from the rising edge of the output S4 to its next following rising edge, as indicated at (A9) of FIG. 6. This output S9 causes the content of the photometric value counter 38 to be transferred in parallel to the shift register 45 in synchronized relationship with the falling edge of the output S9. When the data transfer to the shift register 45 is completed, a shift pulse S10 is applied to the shift registers 45, 46 in synchronized relationship with the rising edge of the output S9 from NAND circuit 44, as shown at (B1) and (B2) of FIG. 6. In response to each application of the shift pulse S10, the individual bits in the shift registers 45, 46 are sequentially supplied to the full adder 47, and the result of addition is again stored in the shift register 46. It is to be noted that the shift register 46 is reset when the power switch is turned on. When the single photometric measurement is made, it (i.e., register 46) stores the content of the photometric value in counter 38. For a plurality of photometric measurements, the contents of the photometric value counter 38 for the individual measurements are added together for storage in the shift register 46.

When the result of addition is stored in the shift register 46, a transfer command signal S11 is applied to the down counter 48 in synchronized relationship with the falling edge of the final one of the shift pulses S10, as indicated at (B3) of FIG. 6. In response to the signal S11, the content of the shift register 46 is transferred in parallel to the down counter 48, which then holds it. When the sum of the photometric values is held by the down counter 48, a control signal S12 of H level is applied to the gate 49 in synchronized relationship with the falling edge of the transfer command signal S11 to enable this gate, as indicated at (C1) and (C2) of FIG. 6. This permits the clock signal S14 (see FIG. 6, (C4)) from the clock pulse generator 41 to be simultaneously fed to the down counter 48 and to the frequency divider 50. The down counter 48 decrements its content by one for each clock signal S14. The frequency divider 50 produces an output S15 which represents the clock signal S14 divided by a number corresponding to the number of photometric measurements and which is supplied to the counter 51, as shown at (C5) of FIG. 6. The counter 51 is cleared to zero for each depression of the photometry switch SW3, and counts the number of output pulses S15 supplied by the frequency divider 50. When the content of the down counter 48 reaches zero, it produces a division complete signal S13, as shown at (C3) of FIG. 6 which disables the gate 49. Accordingly, the clock signal S14 ceases to be applied to the frequency divider 50, thus interrupting a counting operation by the counter 51. The content of the counter 51 at the time its counting operation is interrupted corresponds to the number of clock signals S14 which is equal to the sum of photometric values divided by the number corresponding to the number of photometric measurements, and thus represents an average over a plurality of photometric values. The content of the counter 51 is transferred to the down counter 52 in synchronized relationship with the division complete signal S13. In this manner, for each depression of the photometry switch SW3, an average over a plurality of photometric values is derived and stored in the down counter 52.

After a given number of photometric measurements are made with respect to a desired object being photographed, a shutter release button, 91, may be depressed to initiate a photographing operation. Thereupon, the movable reflecting mirror moves up and the first blind of the focal plane shutter beings running, while simultaneously turning the trigger switch on. This causes a control signal S16 applied to the gate 53 to change its H level, thus enabling this gate. Hence, the clock signal from the clock pulse generator 41 is supplied to the down counter 52, which then operates to decrement its count by one for each clock pulse applied until its content reaches zero, whereupon its output inverts to its H level. Consequently, the switching transistor Q1 is turned off, deenergizing the electromagnet Mg1 to allow the second blind of the shutter to begin running, thus terminating the exposure of the film surface to the image of the object being photographed. In other words, the exposure period of the focal plane shutter is controlled in accordance with the average value over a plurality of photometric values.

While the apparatus of the present embodiment is of a diaphragm preset type, it should be understood that the apparatus can be easily adapted to a shutter speed preset type. Alternatively, an arrangement can be made in the apparatus which permits a selective switching between a diaphragm preset type and a shutter speed preset type.

In the above description of several embodiments, it has been assumed that a plurality of photometric measurements are made, but it should be understood that a single photometric measurement may be made. In this instance, the exposure is controlled in accordance with a single photometric value.

While the average brightness of the object being photographed has been derived as a simple arithmetic mean, it should be understood that a geometric mean or a weighted mean may be used depending on the intended use of the camera.

What is claimed is:

1. A method for effecting photometry for a plurality of areas of an object being photographed with an automatic exposure single lens reflex camera having a taking lens for focussing an image on a film plane and an integral viewfinder cooperating with the taking lens to view the image of the object being photographed and having a single photometric element mounted within the camera adjacent to the viewfinder and located to measure light from an image portion comprising a small area substantially centrally disposed within the image field of the camera, comprising the steps of:

successively aligning, by movement of said camera, said single photometric element with small selected regions of said object through the aid of said viewfinder for determining the brightness of each selected small area of the image field of said object;

activating said single photometric element during each of the aforesaid alignments obtained through the use of the viewfinder for successively obtaining a brightness value at each of the selected small areas of said object and thereby obtaining a photometric value for each of said areas and based on said brightness value;

storing digital representations of said successive photometric values determined by said single photometric element;

developing an average value from the plurality of photometric values for controlling the exposure control means of the camera; and initiating a photographing operation for activating the exposure control means in accordance with the previously developed avarage value.

2. The method of claim 1 further comprising the step of locating the photometric element adjacent to the viewfinder and away from the film plane so as to avoid any interference with the photographing operation, whereby the photographing operation is performed without the need to remove the photometric element.

3. An automatic exposure camera having an apparatus for effecting photometry at a plurality of areas of an object to be photographed, comprising:

a taking lens for focusing an image on a film plane;

a reflecting mirror movable to a down position to permit an object image to be observed;

a viewfinder including an eyepiece to which said object image is directed when said reflecting mirror is in said down position to provide a visual field of view to an observer looking into said eyepiece;

single photometry means for generating a signal representing the brightness of a small portion of said visual field which portion is located substantially in the center of said field of view;

manually operable photometry initiating switch means;

adding means coupled to said photometry means for receiving an output from said photometry means each time said photometry initiating switch means is operated for adding said received output to the present contents of said adding means;

dividing means for dividing the content of said adding means responsive to the number of time said photometry initiating switch means has been operated;

shutter control means for controlling the exposure time of a shutter responsive to an output from said dividing means.

4. An automatic exposure camera according to claim 3 wherein said photometry means further includes conversion means for generating an output having a value corresponding to shutter speed responsive to information supplied thereto relating to film sensitivity and diaphragm value of said taking lens to thereby modify the output value representing brightness of the portion of the object directed to said single photometry means.

5. An automatic exposure camera having an apparatus for effecting photometry at a plurality of areas of an object to be photographed, comprising:

a taking lens for focusing an image on a film plane;

a reflecting mirror movable to a down position to permit an object image to be observed;

a viewfinder including an eyepiece to which said object image is directed when said reflecting mirror is in said down position to provide a visual field of view to an observer looking into said eyepiece;

single photometry means for generating a signal representing the brightness of a small portion of said visual field which portion is located substantially in the center of said field of view;

manually operable photometry initiating switch means;

averaging means for averaging the brightness values obtained when the photometry initiating switch has been operated a plurality of times, the average value being determined responsive to the number of times said photometry initiating switch means has been operated;

shutter release means; and shutter speed controlling means for controlling a shutter according to an output of said averaging means responsive to the operation of said shutter release means.

6. An automatic exposure camera having an apparatus for effecting photometry from a plurality of areas of an object to be photographed, comprising:

viewfinder means for providing a visual field of view of an object to be photographed;

single photometry means for measuring the brightness of a small portion of the visual field of view, said small portion being substantially at the center of said field of view created by said viewfinder means;

photometry initiating switch means;

means for storing photometry values responsive to each operation of said photometry initiating switch means;

averaging means for generating a value representing the average of said stored values;

shutter control means for generating a signal for controlling exposure time;

diaphragm control means for controlling the diaphragm of a shutter;

means for generating a shutter release signal to initiate a photographing operation; and means for selectively operating one of said shutter control means and diaphragm control means responsive to the output of said averaging means upon receipt of a shutter release signal.

7. An automatic exposure camera according to claim 6 wherein said controlling means further includes switching means for selectively coupling said averaging means to one of said shutter control means and diaphragm control means.

* * * * *

UNITED STATES PATENT AND TRADEMARK OFFICE
CERTIFICATE OF CORRECTION

PATENT NO. : 5,126,779
DATED : June 30, 1992
INVENTOR(S) : Yoshihisa Maitani

It is certified that error appears in the above-identified patent and that said Letters Patent is hereby corrected as shown below:

Item [57] Abstract; should read as follows:  --A method and apparatus for effecting photometry in an automatic exposure camera includes the provision of photometric means which determines the brightness of an image field. Upon release of an operating button, photometry is made of the brightness of an object being photographed, utilizing the photometric device, and corresponding photometric values are derived. Each successive value generated replaces the value previously generated. The last value generated is stored for subsequent use.--

Column 5, line 11, change "are" to --is--
Column 5, line 12, change "is" to --are--
Column 5, line 19, change "added" to --adder--
Column 6, line 20, after "inverting" insert --input--
Column 7, line 34, change "summer" to --manner--
Column 9, line 43, change "$l_{41}$ to $l_8$" to --$l_4$ to $l_8$--
Column 10, line 57, change "indicator" to --indicated--
Column 11, line 10, change "state" to --status--
Column 14, line 16, change "avarage" to --average--

Signed and Sealed this

Fifth Day of October, 1993

BRUCE LEHMAN

Attest:

Attesting Officer

Commissioner of Patents and Trademarks